United States Patent [19]

Harvey

[11] 4,445,957

[45] May 1, 1984

[54] METHOD AND MEANS FOR MAKING CONSTANT CROSS SECTIONAL AREA PULTRUDED FIBER REINFORCED POLYMERIC ARTICLES.

[75] Inventor: Dennis L. Harvey, Sterling Heights, Mich.

[73] Assignee: General Motors Corporation, Detroit, Mich.

[21] Appl. No.: 443,240

[22] Filed: Nov. 22, 1982

[51] Int. Cl.³ .............................................. B32B 1/10
[52] U.S. Cl. ................................. 156/180; 156/245; 156/433; 156/441
[58] Field of Search ............... 156/166, 180, 245, 433, 156/441, 500; 264/137, 257, 258, 261, 263; 425/122, 406, 450.1, 451.3, 451.5, 451.6, 465, 466; 249/155, 162

[56] References Cited

U.S. PATENT DOCUMENTS

| | | | |
|---|---|---|---|
| 797,758 | 8/1905 | Sterling | 425/451.3 |
| 2,684,318 | 7/1954 | Meek | 156/180 |
| 3,151,354 | 10/1964 | Bogss | 156/180 |
| 3,530,212 | 9/1970 | Kienle et al. | 264/137 |
| 3,651,188 | 3/1972 | Wolf | 264/137 |
| 3,657,040 | 4/1972 | Shobert | 156/180 |
| 3,873,399 | 3/1975 | Goldsworthy et al. | 156/180 |
| 3,960,629 | 6/1976 | Goldsworthy | 156/180 |

*Primary Examiner*—Michael W. Ball
*Attorney, Agent, or Firm*—Elizabeth F. Harasek

[57] ABSTRACT

A novel method and means are provided for making constant cross sectional area, pultruded, filament-reinfored articles, such as automotive leaf springs, the shapes of which vary along their lengths. The invention features a specially adapted shaping die for the pultrusion process comprising two pairs of spaced apart die members. The die members and die pairs are mechanically linked so that the spacing between pair members can be changed while the cross sectional area of the die opening remains constant.

4 Claims, 9 Drawing Figures

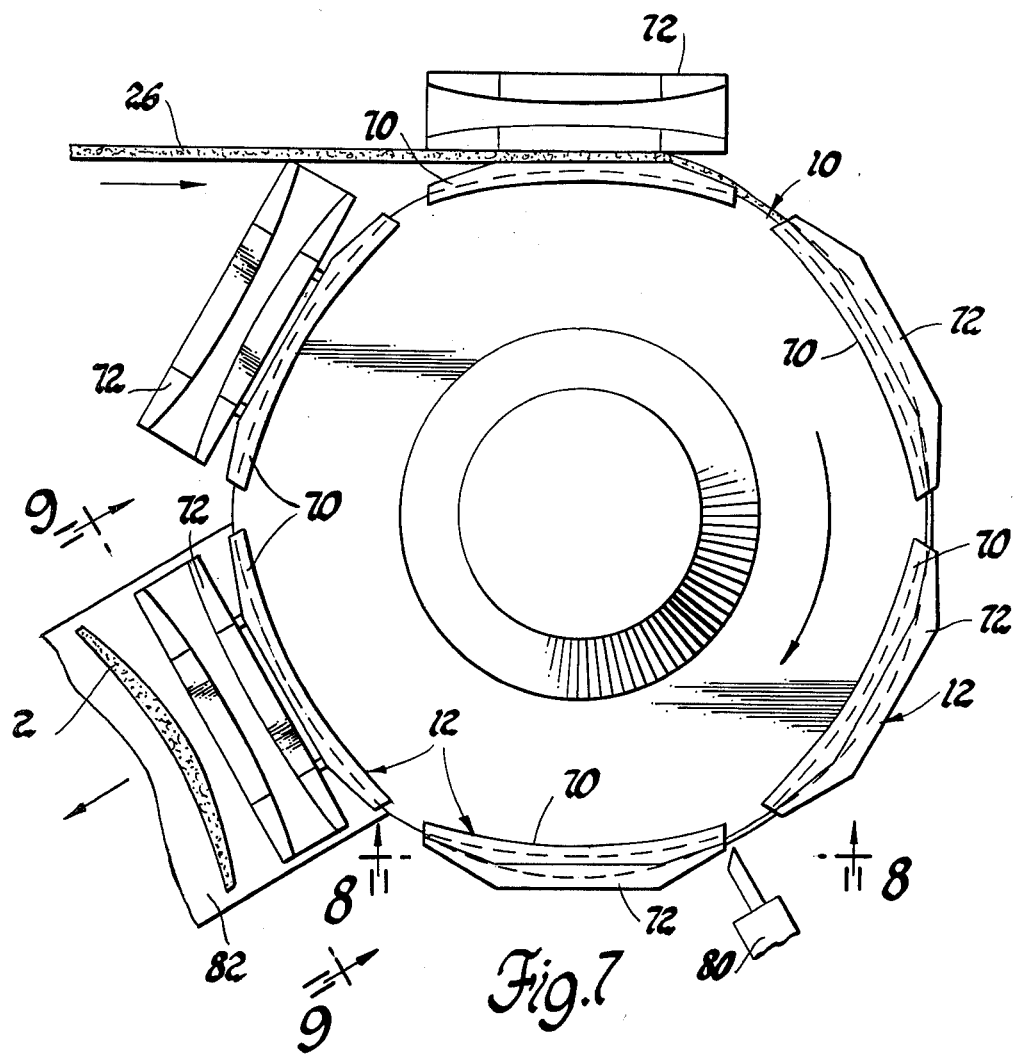
Fig. 7
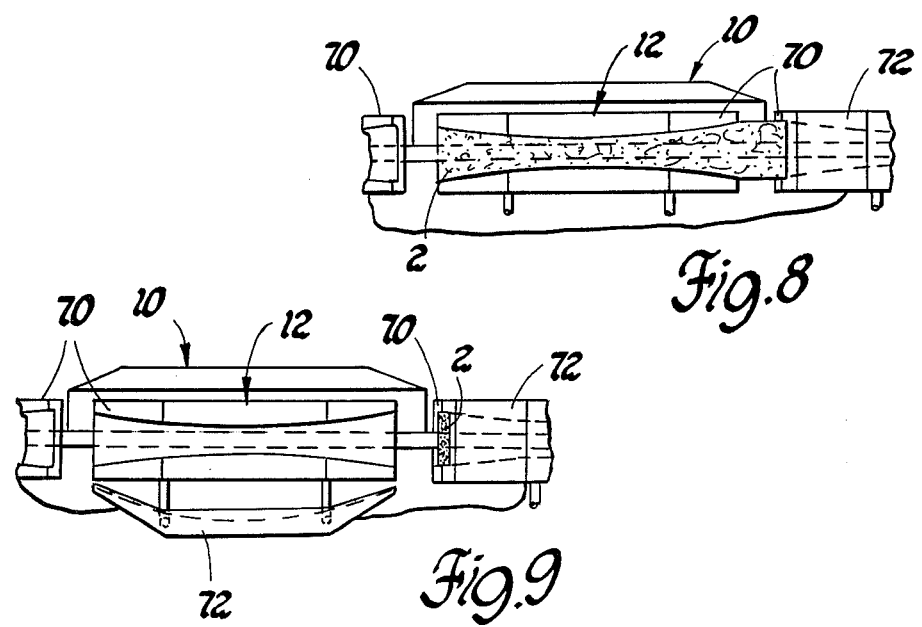
Fig. 8
Fig. 9

METHOD AND MEANS FOR MAKING CONSTANT CROSS SECTIONAL AREA PULTRUDED FIBER REINFORCED POLYMERIC ARTICLES.

BACKGROUND

This invention relates to means and a method for making a constant cross sectional area, pultruded filament-reinforced article, the shape of which varies along its length. More particularly, the invention relates to a novel shaping for use in a pultrusion process where the die has a substantially rectangular shape of constant cross-sectional area but wherein the height and width of the shape are infinitely adjustable.

The term "continuous pultrusion" as used herein involves drawing a bundle of filaments from a source thereof; wetting the filaments with a desired thermosettable polymer resin; pulling the resin-wetted bundle through a shaping die to align the fiber bundles and to manipulate it to the proper cross sectional configuration for laying it down in a mold; and curing the resin in the mold while maintaining tension on the filaments. The most common filament reinforcements are rovings of glass fibers. The most commonly used resins are based on epoxy polymers. Since the glass rovings progress completely through the pultrusion process without being cut or chopped, the resultant products have exceptionally high longtitudinal strength. They are, therefore, uniquely suited for applications such as fiberglass leaf springs.

Pultruded articles generally have a constant cross sectional area. This is because the filament reinforcement occupies a fixed cross sectional area when impregnated with a suitable amount of thermosetting resin. It is important in achieving parts with uniform physical properties to evenly distribute the fiber filaments throughout the completed part. Where a part such as a non-constant cross section, bow shaped, semielliptical spring is desired, some provision must be made to distribute the fiberglass reinforcements evenly to achieve consistent high quality.

U.S. Pat. No. 3,530,212 to Kienle et al, assigned to the assignee hereof, relates to a method of making glass resin laminates of constant cross sectional area and varying shape. In the preferred practice of that invention, resin impregnated rovings are drawn through an open ended die having uniform cross section, the width of which is preferably equal to or slightly less than the width of the article to be molded and the height of which is equal to or slightly greater than the thickness of the article. By being drawn through the die, the rovings are brought together in side-by-side relationship. In order to distribute the fibers throughout the article, the tension on the rovings is released as the compression mold is closed to allow the rovings to fan out and fill the cavity. The mold is then heated to cure the resin and complete the part. It would be preferable in pultrusion processes of the type described in Kienle et al to maintain tension on the rovings as they progress through the pultrusion apparatus without sacrificing uniform filament distribution in molded articles. It would also be desirable to align the filament bundles in substantially parallel, side-by-side relation, before they are laid into the compression mold.

Accordingly, it is an object of the invention to provide a method of molding an article by the pultrusion process where the article has a constant cross sectional area but varies in width and thickness along its length.

Another object of the invention is to provide a novel shaping die which is capable of laying down fiber bundles in compression molds to produce foursided pultruded articles of constant rectangular cross sectional area which may vary infinitely in width and thickness.

A more particular object of the invention is to provide a method of making a bow-shaped, filament reinforced, resinous composite leaf spring having a constant cross sectional area by a pultrusion process. Another specific object is to employ a specially adapted shaping die to assist in the manufacture of articles such as arcuate, bow-shaped, composite leaf springs.

BRIEF SUMMARY

These and other objects may be accomplished in a preferred practice of the invention as follows.

A plurality of elongated filaments are impregnated with a liquid thermosetting resin. The resin impregnated filaments are then drawn together in substantially side-by-side relationship to form an elongated coherent filament bundle. The bundle is then heated to decrease the viscosity and partially cure the thermosetting resin. Thereafter, the resin impregnated bundle is drawn lengthwise through a substantially rectangular shaped shaping orifice or "die" that is formed between a first and second pair of spaced apart die walls. The wall pairs are mechanically linked and relatively movable with respect to each other. The spacing between the walls of the first wall pair defines the ultimate thickness of the bundle while the spacing between the walls of the second wall pair defines the bundle width. The motion of the first and second wall pairs is coupled such that varying the spacing between the walls of the wall pairs provides a die opening of substantially constant cross sectional area but varied width and thickness.

To make a bow-shaped leaf spring by this method, the first and second die wall pairs of the shaping die are initially adjusted to achieve a relatively wide, thin orifice. As the bundle is drawn through the shaping die, the wall spacing is gradually adjusted so that at the center of the spring the die opening defines a cross section that is substantially thicker and narrower than the cross section at the end of the spring. As the bundle continues through the die, the die wall spacing is again adjusted to form a wider, thinner cross section matching that at the other end of the spring.

The operation of the shaping die is carefully coordinated so that the resin impregnated filament bundle is preshaped to match the cross-section of the compression die in which it is laid for final shaping and cure. In a preferred practice, the compression die is mounted on a moving carousel which draws the fiber bundle into the mold. Thus, the bundle is under tension during the entire pultrusion molding process yielding strong, uniformly reinforced springs.

DETAILED DESCRIPTION

In the drawings:

FIG. 3 is a cross section of the spring of FIG. 2 taken along lines 3—3, while

FIG. 7 is a plan view of a carousel arrangement of compression molds for finally shaping bow shaped semi-elliptical fiberglass leaf springs from a filament bundle that has been pulled through a shaping die in accordance with the invention. FIG. 8 is a detailed sectional view of FIG. 7 taken along line 8—8, while FIG. 9 is a detailed sectional view of FIG. 7 taken along line 9—9 with the compression die in an open position.

The invention will be better understood in view of the following description of the several figures.

Figure 1:
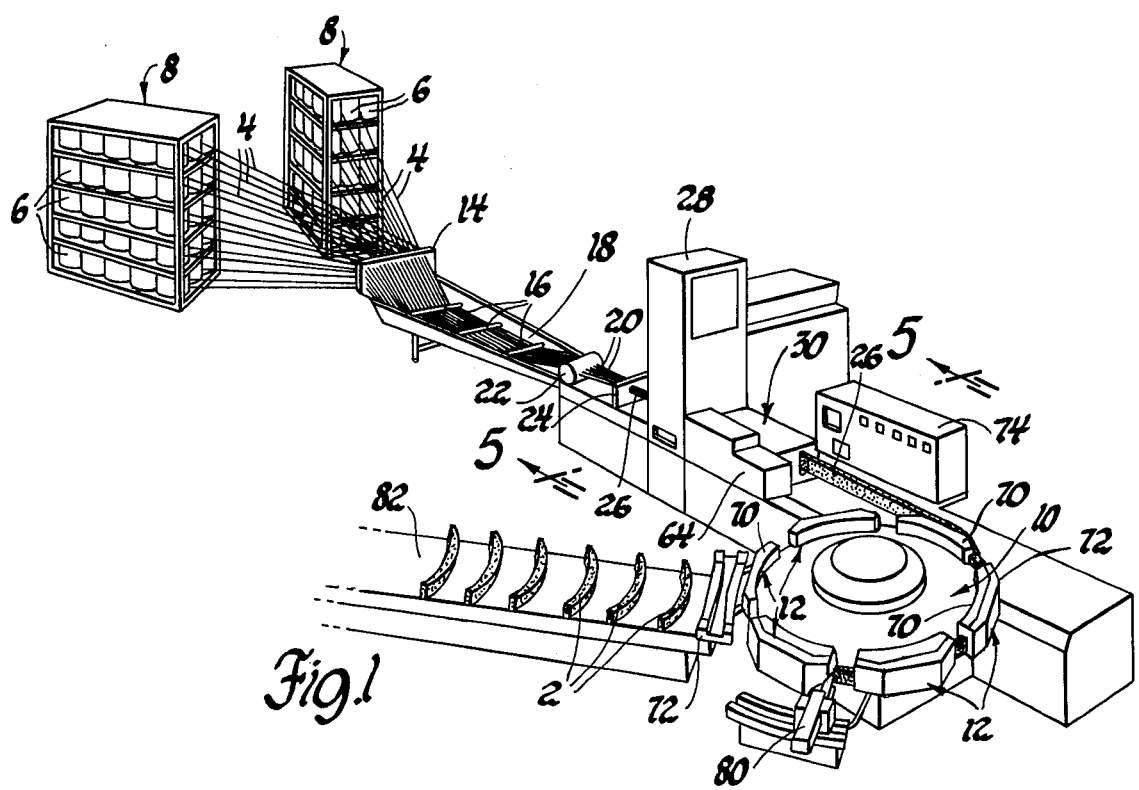
FIG. 1 is a schematic view of a pultruding apparatus for making non-constant, cross section, arcuate, filament-reinforced leaf springs in accordance with the invention.

FIG. 1 shows a preferred device for making fiberglass reinforced automotive leaf springs 2 in accordance with the invention. The springs have substantially constant cross sectional areas but vary in shape along their length to optimize their flex and tensile properties. The springs are made by pulling a plurality of glass filament rovings 4 from creels 6 thereof mounted on spools in storage racks 8. The pulling is accomplished by the rotational movement of carousel 10 carrying a plurality of compression molds 12 in which the springs are finally formed. Glass rovings 4 are threaded through a plurality of spaced apart holes in guide 14.

From guide 14, filaments 4 are directed under impregnating rollers 16 to submerge them in a bath 18 of epoxy or other liquid thermosettable resin. Filaments 4 are then directed through a slotted guide 22 and accumulated in intermediate bundle packages 20 in a fixed size squeeze-out die 24. The finally aggregated filament bundle 26 is then preheated in a radio frequency oven or any other suitable heating unit 28 to decrease the viscosity of the thermosetting resin.

Figure 5:
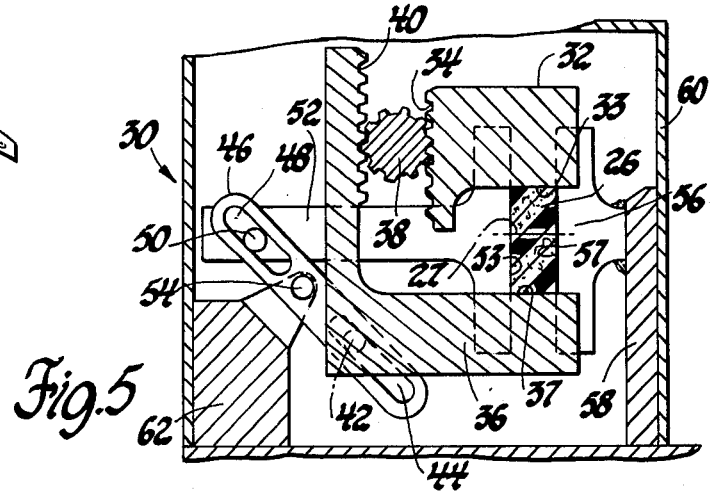
FIG. 5 is a sectional view taken along line 5—5 of FIG. 1 showing an infinitely adjustable, constant cross section die in accordance with the invention.
Figure 6:
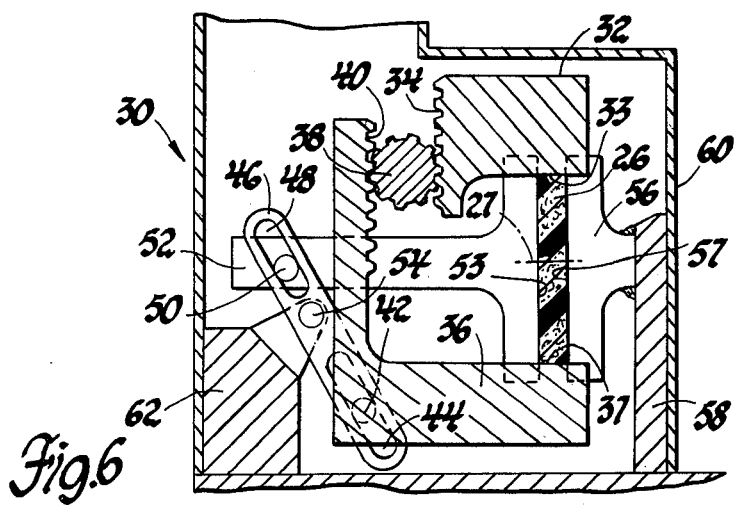
FIG. 6 show the die of FIG. 5 where the spacing of the die walls has been adjusted to a different position.

From heating unit 28, the partially cured, resin impregnated filament bundle 26 is pulled through a specially adapted, constant cross sectional area, infinitely adjustable shaping die 30. A preferred embodiment of die 30 is shown in cross section at FIGS. 5 and 6. Referring to FIGS. 5 and 6, the die opening through which the resin impregnated filament bundle 26 is pulled is formed between first and second pairs of parallel die members. The first die pair consists of top plate 32 having a die forming edge 33. Top plate 32 is mechanically linked to bottom plate 36 through pinion gear 38 which engages racks 40 and 34. By comparing FIGS. 5 and 6 it is evident as pinion gear 38 is rotated in a counterclockwise direction, the space between the die forming edge 33 of top plate 32 and the die forming edge 37 of bottom plate 36 increases. Bottom plate 36 is provided with a fixed pin 42 which slides in slot 44 in pivotably mounted rocker arm 46. At the opposite end of arm 46, slot 48 retains a fixed pin 50 attached to movable side plate 52 of the second plate pair. Again comparing FIGS. 5 and 6, when pinion gear 38 is rotated in a counterclockwise direction its motion is translated through rack 40 such that rocker arm 46 pivots about fulcrum 54 and moves plate 52 toward fixed side plate 56 mounted on support wall 58 and their die forming edges 53 and 57. Fulcrum 54 is permanently affixed to support 62. The entire die is situated within housing 60.

The mechanical arrangement of elements described above assures that center line 27 of the die opening is at the elevation of the molds 12 mounted on carousel 10 regardless of the instantaneous shape of the opening. Movement of top plate 32 and bottom plate 36 determines the separation of die edges 33 and 37 and the height of the die opening while the movement of the side plate 52 via rocker arm 46 determines the separation of side edges 53 and 57 imparting the correct width to the die opening. The device operates such that the area of the die opening, i.e. the cross sectional area of the bundle 26, is always the same even though its height and width are infinitely variable within reasonable limits. The lengths of racks 34 and 40 and the length of slots 44 and 48 in rocker arm 46 determine the extent of dimensional change that the die can accommodate. Pinion gear 38 can be actuated by a motor within housing 64 or any other suitable device. Obviously other mechanical linking means could be used to accomplish like results and such means would be readily available to one skilled in the art.

Referring again to FIG. 1, as the filament bundle 26 leaves the specially adapted pultrusion die 30 its instantaneous shape matches the height and thickness of the section of a mold 12 in which bundle 26 is being laid at the same time. Thus the rotation of carousel 10 is coordinated with the operation of shaping die 30 so that as the end of a spring is being laid in a mold 12 the die opening defines a relatively long, narrow rectangle; so that as the bundle is being laid in the center of the mold, die 30 has a more square cross sectional orifice shape; and at the other end of the mold, the bundle again instantaneously has the long, narrow rectangular shape.

Referring now to FIGS. 1, 7, 8 and 9, a plurality of clamshell-type compression molds 12 are arranged about the perimeter of rotatable carousel 10. The rotation of carousel 10 pulls resin-fiber bundle 26 into the female mold half 70 of an open clamshell mold 12. As soon as the bundle is laid completely in a mold half 70, the clamshell is closed bringing male mold 72 into compression molding engagement with female mold half 70. The rotation of carousel 10, operation of molds 12, operation of pultrusion die 30, and all other mechanical operations may all be coordinated by ordinary and well known mechanical or electrical means, the controls for which may be located within a control panel 74.

Figure 2:
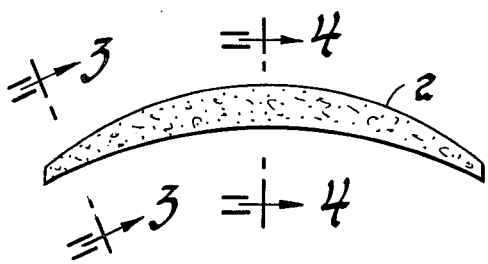
FIG. 2 is a side view of a filament reinforced fiberglass leaf spring.
Figure 3:
Figure 4:
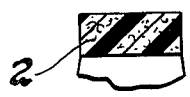
FIG. 4 is a cross sectional view taken along line 4—4.

Bundle 26 instantaneously has the desired cross sectional shape as it is laid into a mold 12. The compression molding which takes place on carousel 10 merely serves to impart the desired degree of curvature (i.e. arcuate shaping) to the spring. Leaf springs preferentially have a semi-elliptical shape. Molds 12 are heated so that the resin hardens rather rapidly and the springs can be demolded in a few minutes. Epoxy leaf springs are preferably postcured in an oven for an extended period. Once the resin has hardened, the bundle is cut at a cutter 80, the mold 12 is opened, and the spring 2 is removed to a conveyor 82. The mold would then be cleaned off and prepared for the next full rotational cycle of the carousel. FIG. 2 shows a side view of a finished spring 2 while FIG. 3 is a cross section taken near the end and FIG. 4 is one taken near the middle. The mold would then be cleaned off and prepared for the next full rotational cycle of the carousel. This system is particularly useful and unlike prior pultrusion devices in that it can form articles with non-circular curvature. The operation of the apparatus may be automatically controlled at a single control panel.

The specific configuration of a given final compression mold will depend upon the article to be produced. However, all articles made by my method using my shaping die will be characterized by the fact that they are very strong due to the even and continuous reinforcement provided by the tensioned, resin encapsulated filaments. Significantly, the process may be highly automated and could be used to make articles at relatively high output rates. The key to the subject invention is the use of the constant cross section, infinitely variable rectangularly shaped die set. Use of the die eliminates the need for excessively high final molding pressures and assures that the filaments are properly disposed in parallel side-by-side arrangement in the finished articles. Dies of other shapes such as hexagonal, triangular, bulging rectangle, etc. could readily be made by one skilled in the art in accordance with this invention.

While my invention has been described in terms of specific embodiments thereof, other forms will be readily adapted by one skilled in the art. Accordingly, the subject invention is to be limited only by the following claims.

The embodiments of the invention in which an exclusive property or privilege is claimed are defined as follows:

1. A method of molding an elongated, filament-reinforced, resinous, composite article having a substantially constant cross sectional area along its length but varying in width and thickness to optimize the strength characteristics of the article, the method comprising: impregnating a plurality of spaced apart elongated filaments with a liquid thermosetting resin; drawing said filaments together in substantially parallel side-by-side relationship to form an elongated coherent filament bundle in which the filaments are loosely bonded together by the liquid resin; heating the impregnated filament bundle to reduce curing time and decrease the viscosity of the resin for better wetting of the filaments; thereafter drawing the filament bundle lengthwise through a shaped die opening formed between adjacent first and second pairs of spaced apart die walls, said wall pairs being relatively movable with respect to each other, the spacing between the walls of the said first wall pair and the spacing between the walls of the said second wall pair respectively defining the thickness and width of a filament bundle drawn therethrough and the motion of the first and second wall pairs relative to each other being mechanically linked such that varying the spacing between the walls of the wall pairs provides a said die opening of substantially constant cross sectional area; varying the said spacing between the walls of the first and second wall pairs of the die as the filament bundle is drawn therethrough such that the width and thickness of each portion of the bundle as it leaves the die substantially matches the desired width and thickness of the corresponding cross section of a compression die in which the bundle is being laid for final shaping of the article and cure of the resin.

2. A method of molding a bow-shaped, filament-reinforced, resinous, composite leaf spring having a substantially constant cross sectional area along its length but varying in width and thickness to optimize the characteristics of the spring when stressed, the method comprising: impregnating a plurality of elongated filaments with a liquid thermosetting resin; drawing said filaments together in substantially parallel side-by-side relationship to form an elongated coherent filament bundle in which the filaments are loosely bonded together by the liquid resin; heating the impregnated filament bundle to decrease the viscosity of and reduce curing time of the resin for better wetting of the filaments; thereafter drawing the filament bundle lengthwise through a substantially rectangular shape die opening formed between adjacent first and second pairs of spaced apart die walls, said wall pairs being relatively movable with respect to each other, the spacing between the walls of the said first wall pair and the spacing between the walls of the said second wall pair respectively defining the thickness and width of a filament bundle drawn therethrough and the motion of the first and second wall pairs relative to each other being mechanically linked such that varying the space between the walls of the wall pairs provides a said die opening of substantially constant cross sectional area; varying the said spacing between the walls of the first and second wall pairs of the die as the filament bundle is drawn therethrough such that the width and thickness of each portion of the bundle as it leaves the die substantially instantaneously matches the desired width and thickness of the corresponding rectangular cross section of the compression mold in which the bundle is being laid; laying said drawn filament bundle into a mold comprising matched concave and convex mold sections which in closed position define the width, thickness, and bowed contour of the molded spring; and hardening the resin in the closed mold to form the said spring.

3. A pultrusion die for making resin bonded elongated filament reinforced articles having constant cross sectional area but varying cross sectional dimensions comprising a pair of edge forming die members for defining opposite edges of the die opening of said die; a pair of side forming die members for defining the opposing side edges of the die opening of said die; means for translating the motion of one of said edge forming members with the other edge forming pair members to regulate the distance therebetween; means for linking the motion of the said side forming die members with the motion of said edge members such that as the distance between the edge forming members is increased or decreased the distance between the side forming members is decreased or increased, respectively, such that the cross sectional area of the die opening formed between the edge and side member pairs remains constant; and means for continuously advancing a bundle of reinforcement through the die.

4. A pultrusion die for making resin bonded elongated filament reinforced articles having constant cross sectional area but varying cross sectional shape comprising a die opening formed between first and second pairs of spaced apart edge forming die members, the spacing between the edges of the first die pair being changeable by the rotation of a pinion gear in racks on each said members; and means mechanically coupling an edge forming member of the second die pair to a member of the said first die pair, said means comprising a rocker arm that is pivotable about a fixed point, said arm translating the motion of the first edge forming die pair through the travel of a fixed first pin mounted thereto in a slot in said arm on one side of the pivot point such that as the spacing between the edges of the first pair of die members is increased or decreased the spacing between the edge forming members of the second die pair is decreased or increased commensurately by the movement of a second pin fixed to a member of the second die pair which travels in a slot in said rocker arm on the opposite side of the pivot point thereby maintaining a constant cross sectional die opening area and means to continuously advance a bundle if reinforcement through the die.

* * * * *